US008495560B2

(12) United States Patent
Dangeville et al.

(10) Patent No.: US 8,495,560 B2
(45) Date of Patent: Jul. 23, 2013

(54) CONVERTING AN ACTIVITY DIAGRAM INTO CODE

(75) Inventors: Nicolas Dangeville, Paris (FR); Yucel Guclu, La Gaude (FR)

(73) Assignee: International Business Machines Corporation, Armonky, NY (US)

( * ) Notice: Subject to any disclaimer, the term of this patent is extended or adjusted under 35 U.S.C. 154(b) by 939 days.

(21) Appl. No.: 12/606,356

(22) Filed: Oct. 27, 2009

(65) Prior Publication Data

US 2011/0088010 A1    Apr. 14, 2011

(30) Foreign Application Priority Data

Oct. 12, 2009    (EP) .................................... 09305965

(51) Int. Cl.
*G06F 9/44* (2006.01)
*G06F 3/00* (2006.01)

(52) U.S. Cl.
USPC ........... 717/104; 717/105; 717/106; 717/109; 715/700

(58) Field of Classification Search
None
See application file for complete search history.

(56) References Cited

U.S. PATENT DOCUMENTS

| | | | | |
|---|---|---|---|---|
| 5,452,453 A * | 9/1995 | Ando et al. | .................... | 717/104 |
| 5,937,188 A * | 8/1999 | Freeman | ........................ | 717/104 |
| 6,314,562 B1 * | 11/2001 | Biggerstaff | .................... | 717/156 |
| 6,973,638 B1 * | 12/2005 | Gangopadhyay et al. | .... | 717/104 |
| 7,599,823 B2 * | 10/2009 | Mosterman et al. | .............. | 703/2 |
| 8,266,580 B2 * | 9/2012 | Wang et al. | .................... | 717/105 |
| 8,327,311 B1 * | 12/2012 | Neema et al. | .................. | 716/136 |
| 2005/0125781 A1* | 6/2005 | Swamy et al. | ................. | 717/144 |
| 2006/0075305 A1* | 4/2006 | Robinson et al. | ............... | 714/38 |
| 2010/0325608 A1* | 12/2010 | Radigan | ........................ | 717/106 |

* cited by examiner

*Primary Examiner* — Henry Tsai
*Assistant Examiner* — Michael Sun
(74) *Attorney, Agent, or Firm* — Patents on Demand P.A.; Brian K. Buchheit; Scott M. Garrett

(57) ABSTRACT

An activity diagram can be converted into code, by traversing the activity diagram to identify the cycles in the activity diagram. Each identified cycle can be stored in a list of cycles. Intermixed cycles among the list of cycles can be resolved. When resolving, the identified cycles can be compared one to another to determine if they have common nodes. If so one of the cycles can be removed from the list of cycles. The other cycle can be labeled as a GOTO loop. The activity diagram can be traversed. For each traversed node, code statements can be generated based on the node type and the labels associated with the node.

16 Claims, 16 Drawing Sheets

CONVERTING AN ACTIVITY DIAGRAM INTO CODE

CROSS-REFERENCE TO RELATED APPLICATIONS

This application claims the benefit of European Patent Application No. 09305965.7 filed 12 Oct. 2009, entitled "A Method of Converting an Activity Diagram Into Code", which is assigned to the assignee of the present application, and the teachings of which are hereby incorporated by reference in their entirety.

BACKGROUND

The present invention generally relates to design model processing and more particularly to a system and a method for converting a design model into code.

In the process of developing computer software, an architecture design needs to be conducted in an appropriate manner by performing an accurate analysis and abstraction of the system specification based on the requirements for a specification of the design target. In this phase of software development, it is well known to use graphical modelization, using a standardized specification language such as the Unified Modeling Language (UML). UML is a design method including an abstraction of the design target, a visualization, a specification determination, and a drafting of documents related to the design.

The models created with UML, such as the class diagrams, are derived to actual programming code. UML is generally used for object oriented development but is more commonly adopted by the industry for high level software design. The benefits of using UML during the design phases of software development and describing software artifacts include the ability to conduct design review with a commonly accepted, high design language. It allows for capturing the critical information that describes the application without detailing it down to the implementation level, and applying Model Driven Architecture techniques that provide code generation.

Describing an application involves describing the data structures that it manipulates and the flow of actions and operations that the application performs. In an object oriented language, made up of several classes that interact with each other and of code dispatched through several methods of each class. The control flow of the application involves various interactions between methods of various classes. In a procedural language, an application is defined by a main program that can interact with others. The control flow is mainly defined within each program.

An activity diagram is one of the behavioral diagrams in UML and is used to capture dynamic aspects of the system. It is well suited to capture a high level description of the control flow of a program, especially written in a procedural language.

UML activity diagram can therefore be used to capture the control flow of a program. From there, it is valuable to generate a skeleton of code from the activity diagram in order to translate the information it contains into source code that would be enhanced by a developer. However, the nature of the activity diagram, being an oriented graph, makes it difficult to apply a method and transform its contents into code, which is sequential by nature.

One known solution to this problem is the approach taken in the article by Philip Mayer, Andreas Schroeder, and Nora Koch entitled "A Model-Driven Approach to Service Orchestration" for Institute for Informatics, July 2008. This solution is based on the well-known depth-first search algorithm and provides a method to identify branches, loops and parallel flows in an activity diagram and transform such an activity diagram into code (BPEL). However, this solution has several constraints that must be followed in order to be able to generate some code from the activity diagram. In particular, the user is required to use dedicated patterns of nodes in order to represent decisions or loops. In particular, a condition needs to be "balanced", which involves ending with a merge node and a loop needs to start or end with a merge node.

This solution thereby introduces constraints during the software development process while architects need to focus on the functions they want to achieve instead of their representation. Further, they need to be able to draw the flow of actions of their programs as freely as possible. These constraints also impose to design the activity diagram—which is a graph and in other words a non linear construct—in a linear way, with a single start and end. The dedicated patterns of nodes, such as merge nodes, required by this solution are generally optional constructs in a UML diagram: it is possible to draw a UML diagram without necessarily involving them. Actually, most diagrams do not use merge node except when it is desired to explicitly state the merge as semantically important. Having to involve unnecessary nodes in the process, and writing a graph in a linear way constitute significant constraints in the development process. This renders code generation inapplicable in practice.

Another solution to this problem is described in the article entitled "An algorithm for structuring flowchart", by Brenda S. Baker, Journal of the Association for Computer Machinery, Vol. 24, January 1977. This solution provides a method to generate code from a graph. The purpose is to process existing FORTRAN programs to facilitate their maintenance, and represent the FORTRAN program in a graph that is then processed to produce a more readable version of the code. This method does not require that a decision node would be closed later in the graph, and thereby does not require a specific type of closing node. However, this method does not deal efficiently with balanced decision nodes. Further, the input of this method is existing FORTRAN source code. The graph is obtained from this existing FORTRAN source code in order to create better FORTRAN code. This solution is therefore not adapted for situations where the graph is not obtained from existing source code. Further, this solution applies the in-depth graph processing algorithm, which does not make any distinction between arcs of a graph that are balanced and represent a set of instructions that fork then merge. It considers each fork in the graph to represent an unconditional transfer of control (GOTO).

SUMMARY

In order to address these and other problems, there is provided a method (e.g., claim 1), a computer program, a computer readable medium and a system (e.g., claim 12-14).

The disclosure accordingly includes an embodiment that allows for efficient and automatic code generation from graphical modelization while limiting the constraints to the diagram. Further, information contained in an activity diagram can be translated into source code that can be enhanced by a developer.

Further, according to an embodiment of the disclosure, the pre-processing of an activity diagram for code conversion does not require a decision node to be balanced with a merge node and does not require all branches to converge to a point of the same branch of the graph.

The method according to one embodiment of the disclosure also recognizes balanced decision nodes (decision nodes that will be closed later in the graph, not necessarily by a merge node), thereby avoiding systematic use of GOTOs, and does not disrupt the initial flow intended in the diagram.

BRIEF DESCRIPTION OF THE DRAWINGS

Embodiments of the disclosure will now be described by way of example with reference to the accompanying drawings in which like references denote similar elements, and in which.

DETAILED DESCRIPTION

Figure 1:
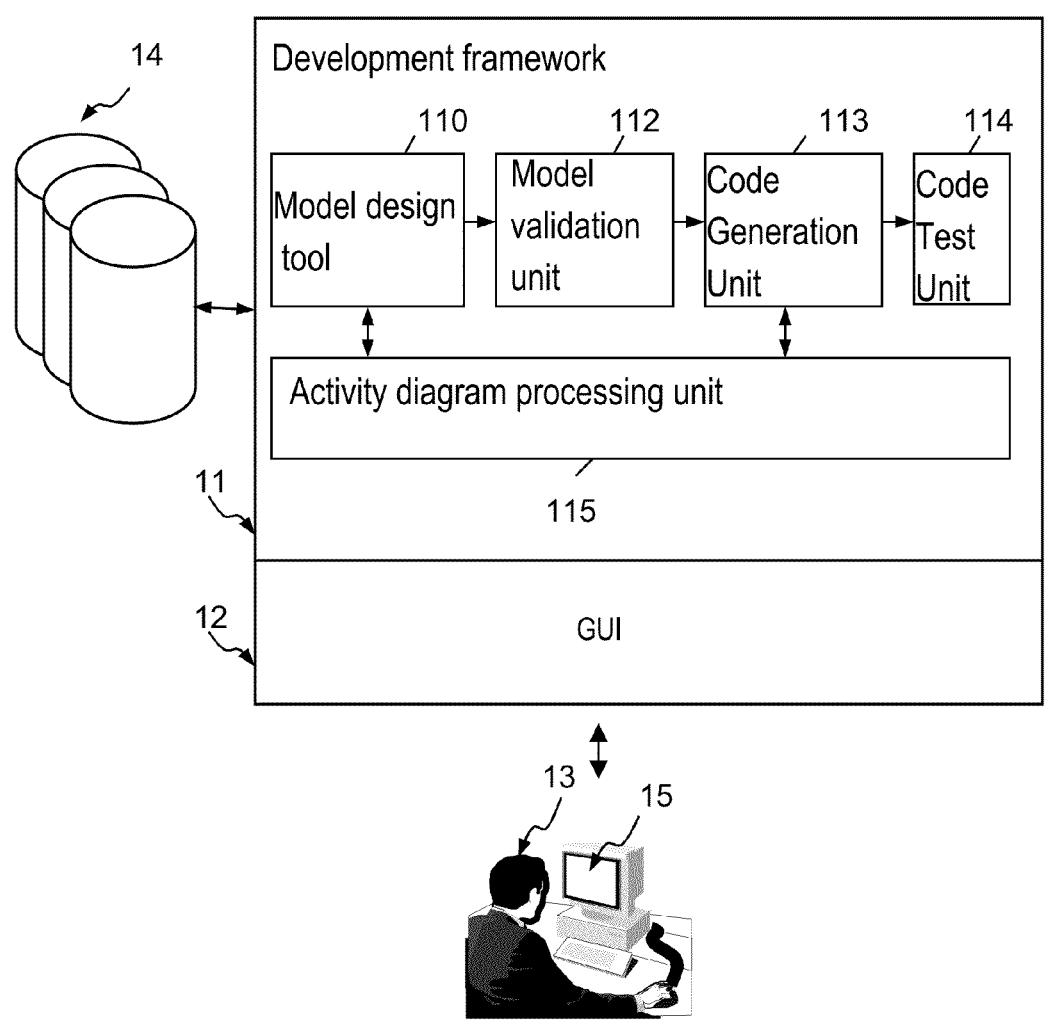
FIG. 1 shows a system for converting an activity diagram into code according to certain embodiments of the invention.

FIG. 1 shows a computer system 100 for generating code from a graphical modelization. The system 100 includes a development framework unit 11 whereby an analyst 13 may use a suitable procedural programming to design programs.

The system further includes a unified modeling language (UML) design tool 110 that allows the analyst 13 to generate a UML model of a user interface environment. The present description is made with reference to UML modeling language for illustrative purpose only. However, that invention is not limited to such modeling language and may include a plurality of other modeling languages adapted to generate activity diagrams.

The system 100 further includes a model validation unit 112 for validating generated UML models.

The system may be, for example, a workstation including a CPU mutually connected to a memory, a disk, a display adapter, a user interface (12) and one or more network interfaces through bus. The CPU may be connected to a keyboard and a mouse (not shown) through the user interface 12, to a display device 15 through the display adapter, and to one or more networks through network interfaces. The present invention is not limited to this hardware configuration and may include a plurality of other system configurations.

Repositories 14 may be used to store models, data generated during the activity diagram processing, code elements, scripts etc. Such repositories may be accessed by the different components of framework 11.

To modelize the application, a UML class diagram representing classes and their relationships is displayed on the user interface 15. These classes can be used by the components of the application.

The analyst 13 can extend the class diagram and identify the operation of a class, which represents a program. He can create an activity diagram, associated with the program, which will capture the control flow of said program.

According to the embodiments of the invention, system 100 further includes an activity diagram processing unit 115 to pre-process activity diagrams for conversion into code and a code generation unit 113 for converting the activity diagrams into code using the result of the pre-processing performed by the activity diagram processing unit 115. A testing unit 114 may also be provided to test the generated code using a code test environment.

The activity diagram processing unit 115 is arranged to process activity diagrams that describe the control flow of a program and provide code generation functions to code for this diagram.

The activity diagram processing results may be stored in the repository 14 or in any suitable memory structure.

An activity diagram provides a view of the behavior of a system by describing the sequence of actions in a process.

Activity diagrams are commonly used in computer science to represent a number of different structures. An activity diagram comprises a set of nodes with corresponding connections (arcs or edges). Each arc is assigned a direction to designate movement from a source node to a target node.

An activity diagram uses activity nodes and activity edges to model the flow of control and data between actions. An activity diagram further has a single starting point, referred to as the initial node. It may also include several end points, referred to as the final nodes, and that indicate that the modeled process is finished.

Activity Diagrams may include an action node that represents a discrete unit of functionality in an activity. Action nodes have incoming and outgoing activity edges that specify the flow of control and data to and from other activity nodes. The actions in an activity start when all of the input conditions are met. Each action has a unique name that describes the behavior.

Activity diagram may also comprise control nodes that coordinate the flow of control in an activity. The control node may be a final node that represents a point where one or flows in an activity stop, a decision node representing a point in an activity where a single incoming edge divides into several outgoing edges, an initial node marking the point at which a flow begins when the activity or structured activity node is invoked, or a merge node representing a point in an activity where several incoming edges come together into a single outgoing edge.

Even if the disclosure is not limited to such activity diagrams, the disclosure has particular advantages for input activity diagrams having certain properties among the following ones: oriented graph with an identified beginning; no isolated sub-graph; ability to declare branch in nodes; the ability to merge nodes.

Figure 2:
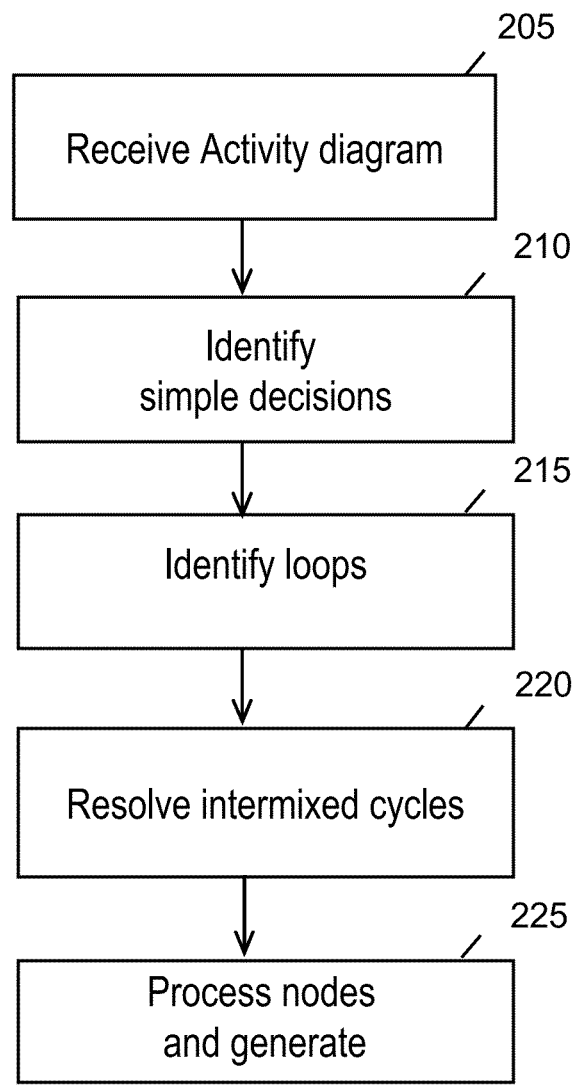
FIG. 2 shows a high-level flowchart describing the method for converting an activity diagram into code according to certain embodiments of the invention.

FIG. 2 is a high-level flowchart illustrating the method for converting an activity diagram into code according to embodiments of the invention. The input activity diagram is processed in multi passes to calculate and store data regarding the structure of the activity diagram (loop node lists, decision node lists, targets of GOTO statements) and then the nodes of the diagram and the stored data are used to convert the activity diagram into code.

In step 205, an activity diagram is inputted. The activity diagram captures the control flow of a program at a logical level. It contains the actions, decisions and flow between these nodes necessary to describe the control flow of an application. This activity diagram is provided by the analyst 13 of the application after executing a design work through graphical tools for object model creation.

In step 210, the "simple decision" patterns in the activity diagram are identified. A simple decision pattern (also called a balanced decision pattern) is made of a set of nodes, which starts by a decision node and closes in a subsequent node, this node not being limited to merge type. Such a pattern is used to generate an "IF-THEN-ELSE" construct and resumes the sequence with the next instruction. More specifically, in the control flow of the program, a single branch processes an instruction that precedes the IF statement. A fork occurs and two branches (one for THEN, one for ELSE) are opened. With a "simple decision", those branches will eventually merge. The statement where the branches merge is common for the two branches. Therefore, the initial common branch is resumed. When such a pattern is found, it is associated with the starting decision node. An "IF-THEN-ELSE" construct is a conditional statement according to which actions depend on whether a specified condition evaluates to true or false. An "IF-THEN-ELSE" expression is interpreted as follows: when "IF" is found by an interpreter, a Boolean condition is expected. If the condition is true, the statement block following the THEN is executed. Otherwise, the execution continues in the ELSE block. In the following description, the expression "balanced decision" may be also used to designate simple decisions.

Figure 3:
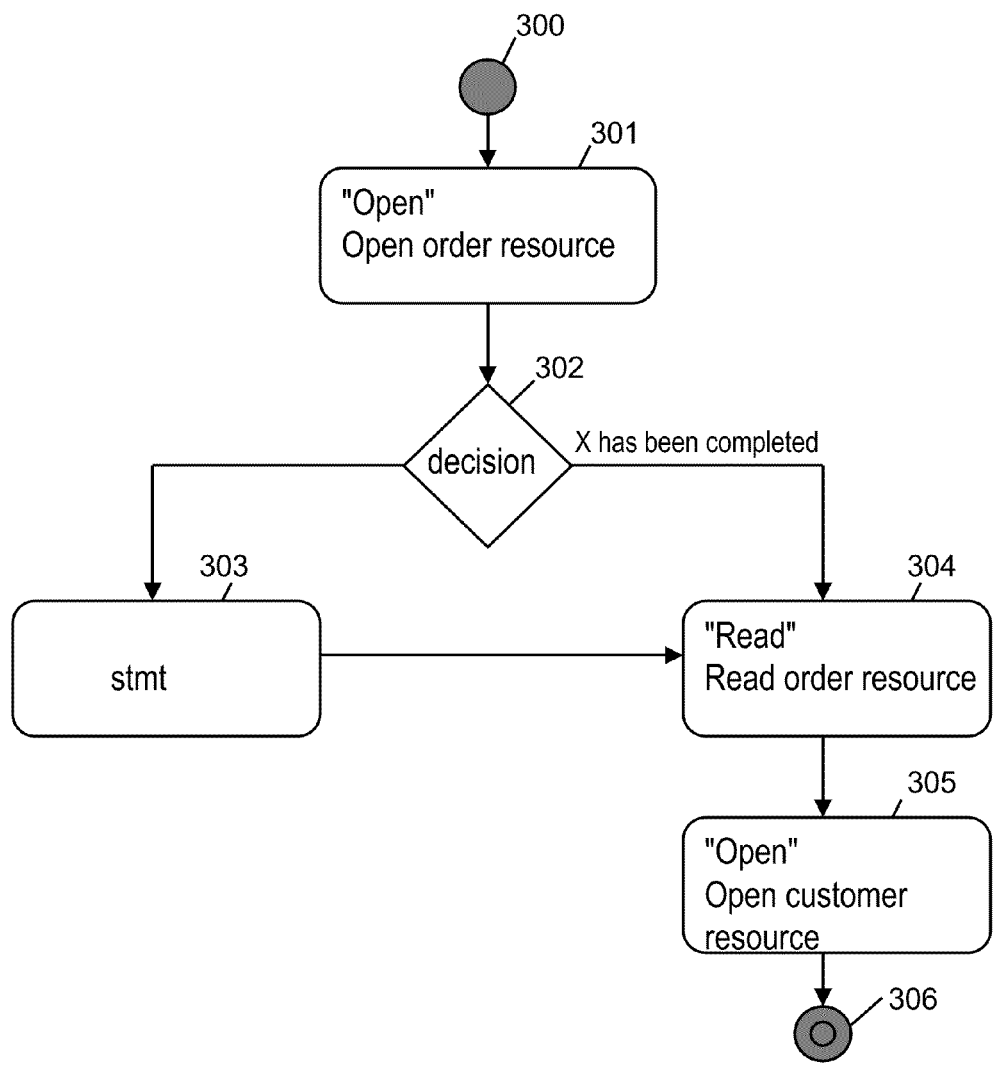
FIG. 3 shows an exemplary activity diagram illustrating a simple decision pattern.

FIG. 3 shows an exemplary activity diagram 30 with a simple decision pattern. The activity starts with action node 301 followed by a decision node 302. The decision has 2 branches. One of the branches (starting from node 303) joins the other (starting from node 304). This is a case where the Read instruction should not be considered as being included in the condition. The sequence should be resumed once the condition ("x has been completed") is handled and the read node 304 is executed next in sequence unconditionally. As represented in FIG. 3, the round rectangles represent actions such as 304 while the diamonds represents a decision such as 302. A decision node 302 includes at least two branches starting from node 303 and from node 304, among which a THEN branch and an ELSE branch. A start node such as node 301 is related to a start symbol such as node 300. An end node is related to an end symbol such as 306. The activity diagram 30 represents the following sequence: open order resource (301) and if X has been completed (decision 302) read order resource (action 304) and open customer resource (action 305). If X has not been completed (decision 302) then action 303 ("stmt") is performed before performing action 304 and 305. Therefore actions 304 and 306 are performed unconditionally. This activity diagram includes a simple decision pattern starting from decision node 302 to action node 304.

It should be noted that the disclosure is not to be limited to the type of activity diagram symbols represented in the figures, and may apply to any type of activity diagram representation or notation.

Turning back to FIG. 2, step 210 thereby marks all the simple decisions identified in the diagram, through a first pass of the activity diagram. In step 215, the diagram is analyzed applying a second pass on the activity diagram to identify the cycles it contains. A cycle represents a sequence of actions which is specified once but which may be carried out several times in succession. The cycles identified in the activity diagram are stored in a list of cycles.

In step 220, intermixed cycles among the list of cycles obtained in step 215 are resolved. Step 220 filters the cycles in order to discard the intermixed cycles and to consider one of them as unconditional transfer of control (GOTOs) instead. After this step, it remains only separated cycles and/or cycles contained in the body of other cycle(s) (nested). Those cycles will generate loops.

At this stage, simple decisions and loops are identified and targets of unconditional transfer of control (GOTO) are labeled.

The result of the pre-processing steps 205 to 220 are used to convert the diagram into code. During the conversion phase, the pre-processing results are used to guide the recursive processing of the nodes. This allows a generic recursive processing to be applied during the conversion phase 225, with the ability to distinguish, for example, simple decisions from decisions that never merge.

The pre-processing steps 205 to 220 further allow identification of nodes that contribute to a given pattern (such as simple decisions and loops). Those results are stored in data structures such as arrays in memory and attached to the first node of the pattern that occurs in the diagram.

In step 225, the nodes are processed to generate code in a third pass of the activity diagram. The code generation phase uses an in-depth like graph processing and a sequential graph processing, based on the patterns information that has been identified in the pre-processing steps.

Figure 4:
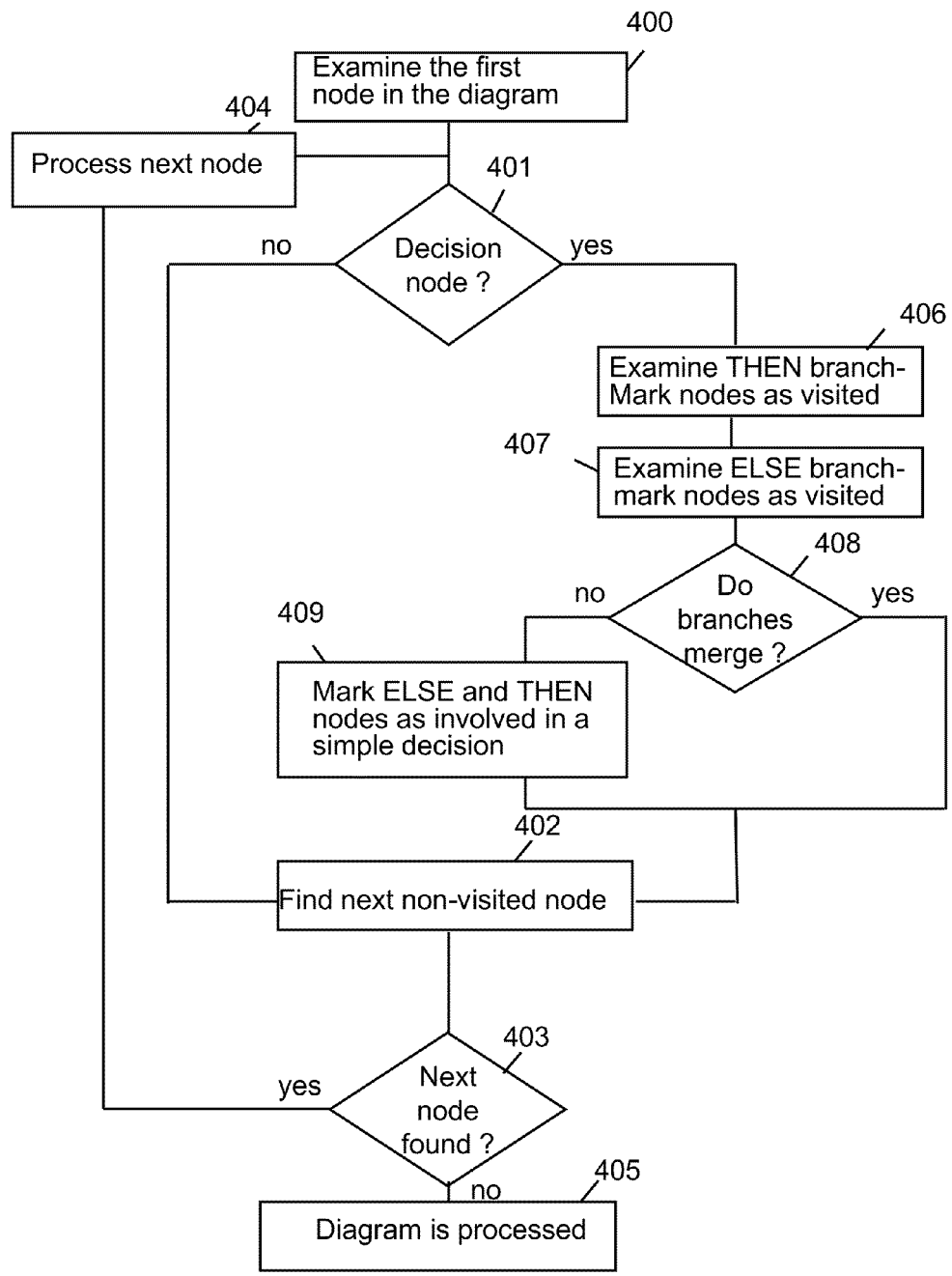
FIG. 4 shows a flowchart describing the detection of simple decisions.

FIG. 4 shows a flowchart illustrating the detection of "simple decisions" in the activity diagram according to the invention. A simple decision has one incoming branch with one input and two outgoing branches, with one output each, and includes a decision node containing the expression of a condition. During this preliminary phase, a first pass of the activity diagram is performed to detect the simple decisions in the activity diagram, add the nodes identified as belonging to a simple decision to a structure in memory dedicated to store the list of nodes that constitute a simple decision. This structure may be attached to the initial decision node. Therefore, when the third pass for code generation occurs, it is possible, when reaching a decision node, to know whether it is involved in a simple decision or not. If it is, then the list of nodes that make-up this simple decision until the sequence resumes will be directly available.

More specifically, in step 400, the activity diagram processing starts. A recursive algorithm is applied to traverse the nodes of the diagram, starting with the first node which is the initial node.

The activity diagram is adapted for being traversed through its nodes. Each node is able to provide information such as its name and type. It can provide a reference to its parents. It can provide a reference to its children. Traversing the diagram can thereby involve resolving a reference and moving to that referenced node.

In step 401, the activity diagram processing device checks whether the node being processed is a decision node. If it is not a decision node, step 402 looks for the next non-visited node. In step 403, it is then determined if such next node is found. If there is a next node to be processed in the activity diagram, the next node in the sequence is recursively processed in step 404. Otherwise, this means that all the nodes of the activity diagram have been processed, and processing of the activity diagram is finished in step 405.

If it is determined in step 401 that the current node is a decision node, the THEN branch is examined in step 406. The list of all the nodes leading to a potential closing node is calculated. A potential closing node is either a merge node or an action node with more than one incoming edges. The nodes of the THEN branch being considered are marked as visited using a "visited" tag. A potential closing node may or may not have been found. Therefore, the list of nodes leading to a potential closing node ends when either an end node or a merge node, or an action node that does not have any outgoing arc, or an action node that has two or more incoming arcs, is reached. The same processing is applied in step 407 to the ELSE branch.

Step 408 determines if the list of nodes obtained from the THEN branch and the list of nodes obtained from the ELSE branch merge. This allows finding if the lists share a potential closing node. If the lists share a potential closing node, then all the nodes involved from the decision up to the closing node are being marked as involved in a simple decision. The nodes involved in each branch of the simple decision are stored in a dedicated data structure in step 409. This data structure is itself stored and associated with the initial decision node, so that they can be processed specifically in a later stage.

In step 402, the activity diagram processing device continues the recursive processing for the next node that has not yet been visited. Step 403 checks if such a next node exists. If it does, then recursive processing for this node is performed (step 404). Otherwise, processing of the diagram is finished (step 405).

When processing is finished (step 405), all the visit flags on the nodes are reset to ensure that the next pass of processing can re-explore the diagram from a clean state.

Figure 5:
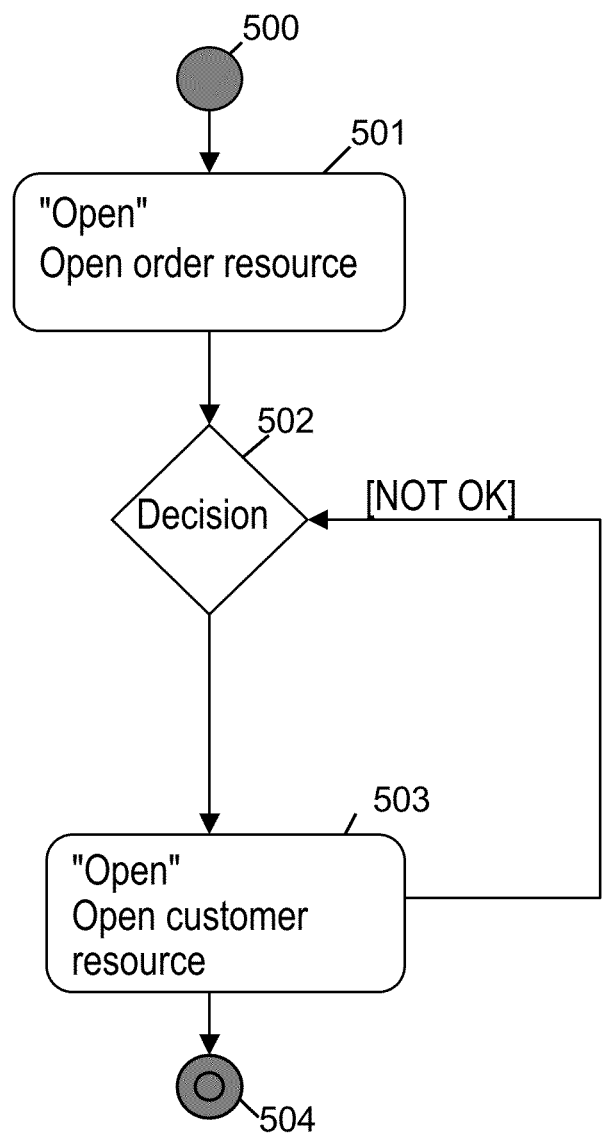
FIG. 5 shows an exemplary activity diagram illustrating a loop starting with a decision node.

FIG. 5 is an exemplary activity diagram showing a simple loop that involves a decision node. The diagram starts with an initial node 500, then to an action node 501 ("open order resource"), followed by a decision node 502. One branch of the decision node ("Not ok") leads to the previous action node 501. This introduces a loop. The other branch leads to another action node 503 ("open customer resource") that is followed by the final node 504.

Figure 6:
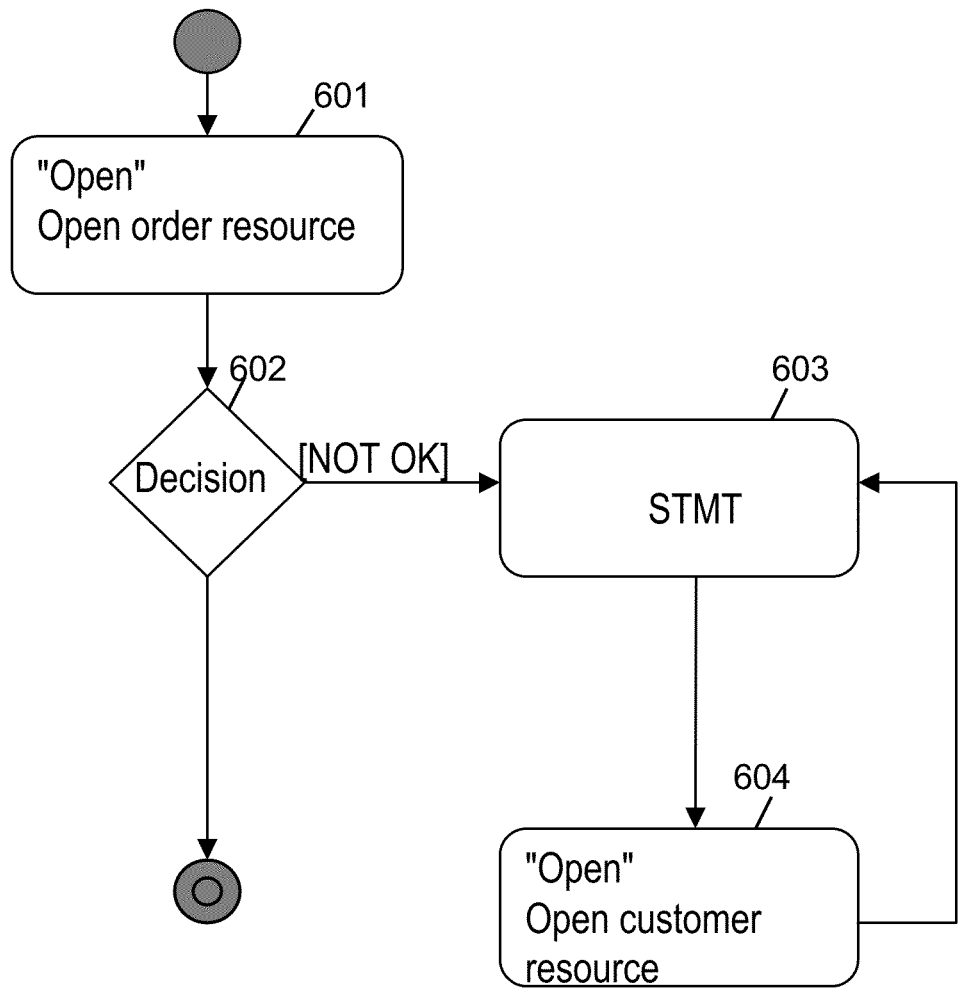
FIG. 6 shows an exemplary activity diagram illustrating a loop that does not start with a decision node.

FIG. 6 shows another exemplary activity diagram including a simple loop that does not involve a decision node. The diagram starts with an initial node 600, followed by an action node 601 ("open order resource"), and then a decision node 602. One branch of the decision node ("not ok") leads to an action node 603 ("stmt"). This action node 603 ("stmt") leads to another action node 604 ("open customer resource"), which itself leads to the previous node 603. Accordingly, the node called "stmt" leads to node "open customer resource", which itself leads to node "stmt", thereby defining a simple loop. The node "stmt" 603 has two incoming arcs: one from "open customer resource" and one from the decision node.

Figure 7:
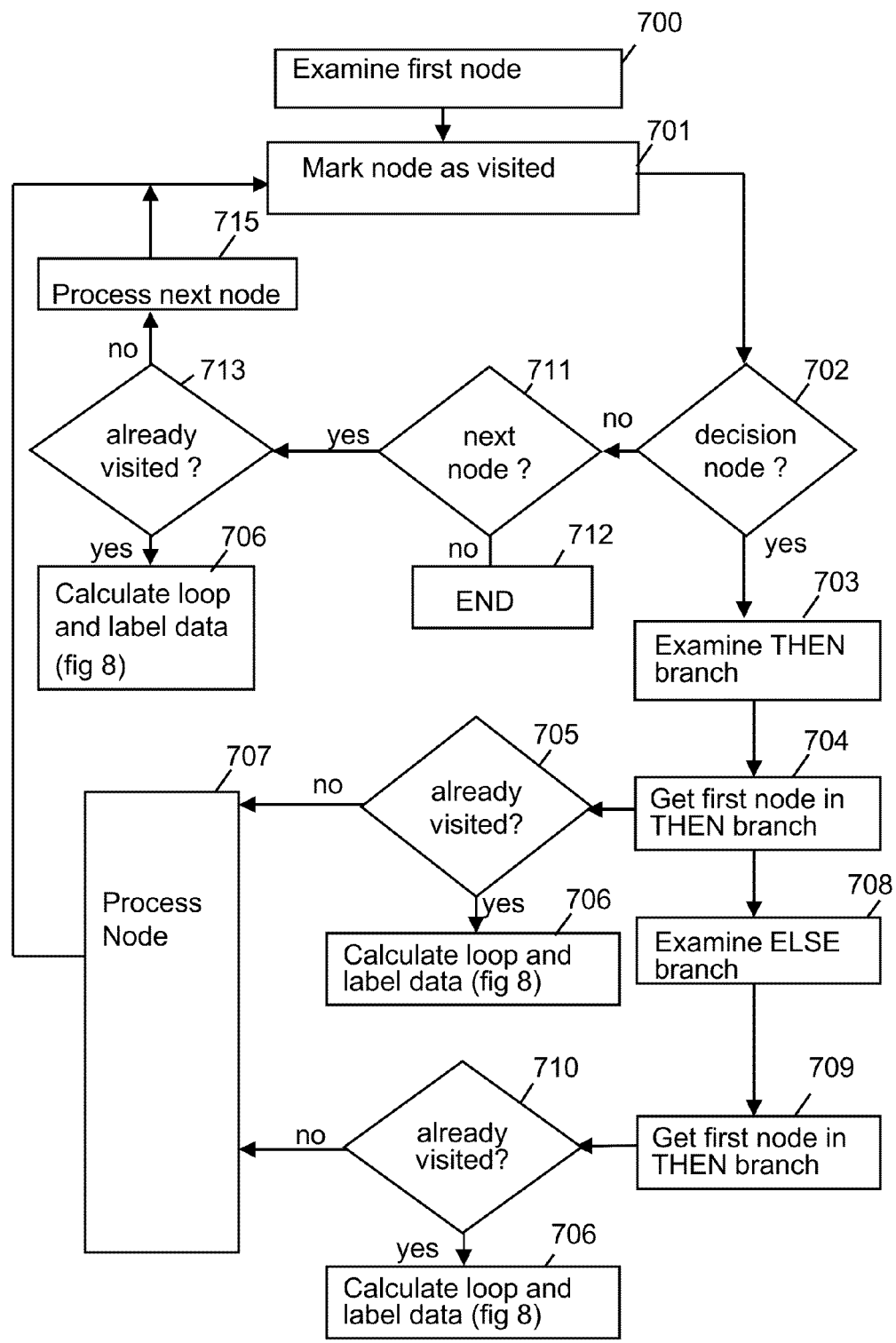
FIG. 7 shows a flowchart for detecting cycles and loops in the activity diagram.

FIG. 7 shows a flowchart for identifying cycles and determining, amongst the cycles, the loops (step 215 of FIG. 2). During this phase, the activity diagram is traversed in one pass to detect cycles and store information related to the detected cycles in memory for use during the code conversion phase. Each cycle will be stored as a list of node and associated to the first node in the diagram that is involved in the cycle.

The processing starts in step 700 with the initial node of the activity diagram. This processing involved a recursive algorithm that starts with step 701. Step 701 marks the node being processed as being visited.

In step 702, it is determined whether the node being processed is a decision node. If the current node is identified as a decision node in step 702, the THEN branch of the decision node is recursively examined in step 703. The first node of the THEN branch is first being considered in step 704. Step 705 first checks if the examined node in the THEN branch (thereinafter referred to as "node being explored" or "explored node") has already been visited. If it has been visited, step 706 determines either a cycle or an unconditional transfer of control (GOTO loop). If it has not been visited, then this node is processed recursively (step 710) by iterating step 701 on this node.

Figure 8:
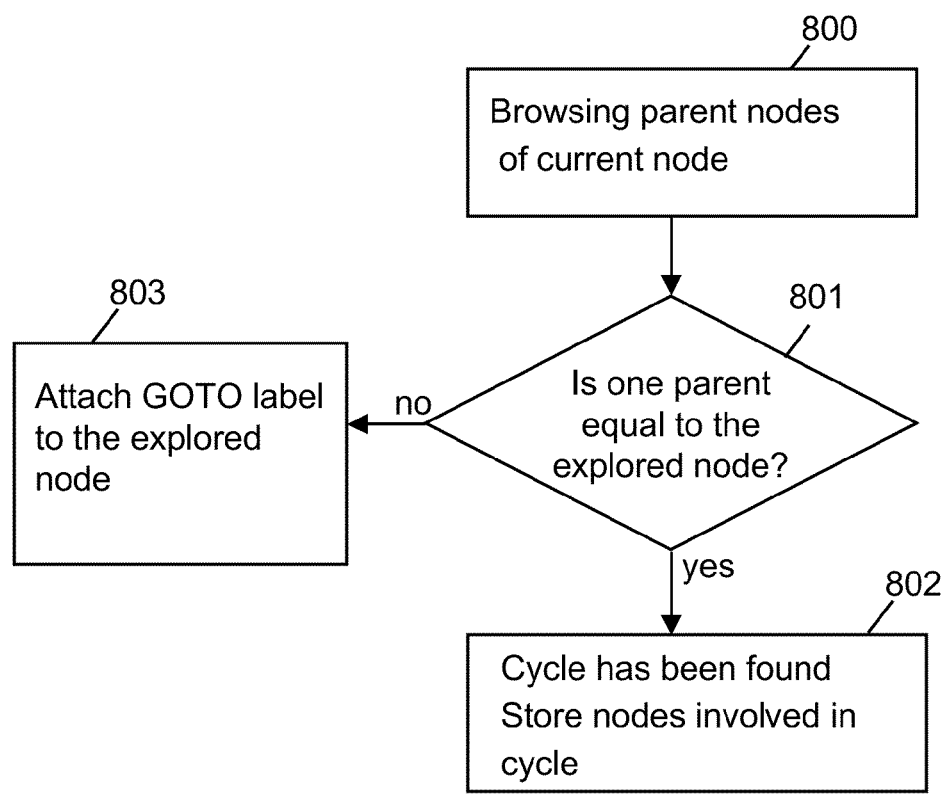
FIG. 8 shows a flowchart describing the identification of cycles and GOTO loops.

In step 708, the ELSE branch is processed. The same processing as with the THEN branch is performed for the ELSE branch: the first node of the ELSE branch is first considered in step 709, and step 710 checks if this node (thereinafter referred to as "node being explored" or "explored node") has already been visited. If it has already been visited, then step 706 identifies either a cycle or an unconditional transfer of control GOTO (FIG. 8). If it has not been visited, then this node is processed recursively in step 707 by iterating step 701 on this node.

If it is determined in step 702 that the current node is not a decision node, then the next node in sequence is looked for in step 711. If there is no next node, then the processing of the activity diagram is finished in step 712.

If there is one next node, then it is determined if this node has already been visited in step 713. If it is determined that the next node has been visited (thereinafter referred to as "node being explored" or "explored node"), then step 706 identifies either a cycle or an unconditional transfer of control GOTO (FIG. 8). If the node has not been visited, then this node will be processed recursively (step 715) by reiterating step 701 on this node.

FIG. 8 describes in more detail step 706 of identifying cycles or GOTO loops for a traversed node when it is determined that the explored node (either the next node of step 711 or the branch node of step 704 and 709) has already been visited.

In step 800, all the parents of the current node are browsed. Step 801 determines if a parent of the current node corresponds to the explored node (either the next node of step 711 or the branch node of step 704 and 709). If a parent is found that equal the explored node, then step 802 identifies a cycle. The content of the cycle in terms of nodes is captured and stored in a data structure in memory. If there is no parent matching the explored node, step 803 identifies an unconditional transfer of control (GOTO). The explored node is then accordingly the target of a GOTO, and a label is associated with it. This label will be used at generation time when the current node is being generated (GOTO label) and when the node being explored is generated (define the label before the statements).

Accordingly, a GOTO structure is only generated when a node is detected as being visited twice (and not in a balanced decision sub-graph). This prevents from generation of GOTOs in balanced decision sub-graphs, using the "simple decision" patterns that have been identified in step 210.

Figure 9:
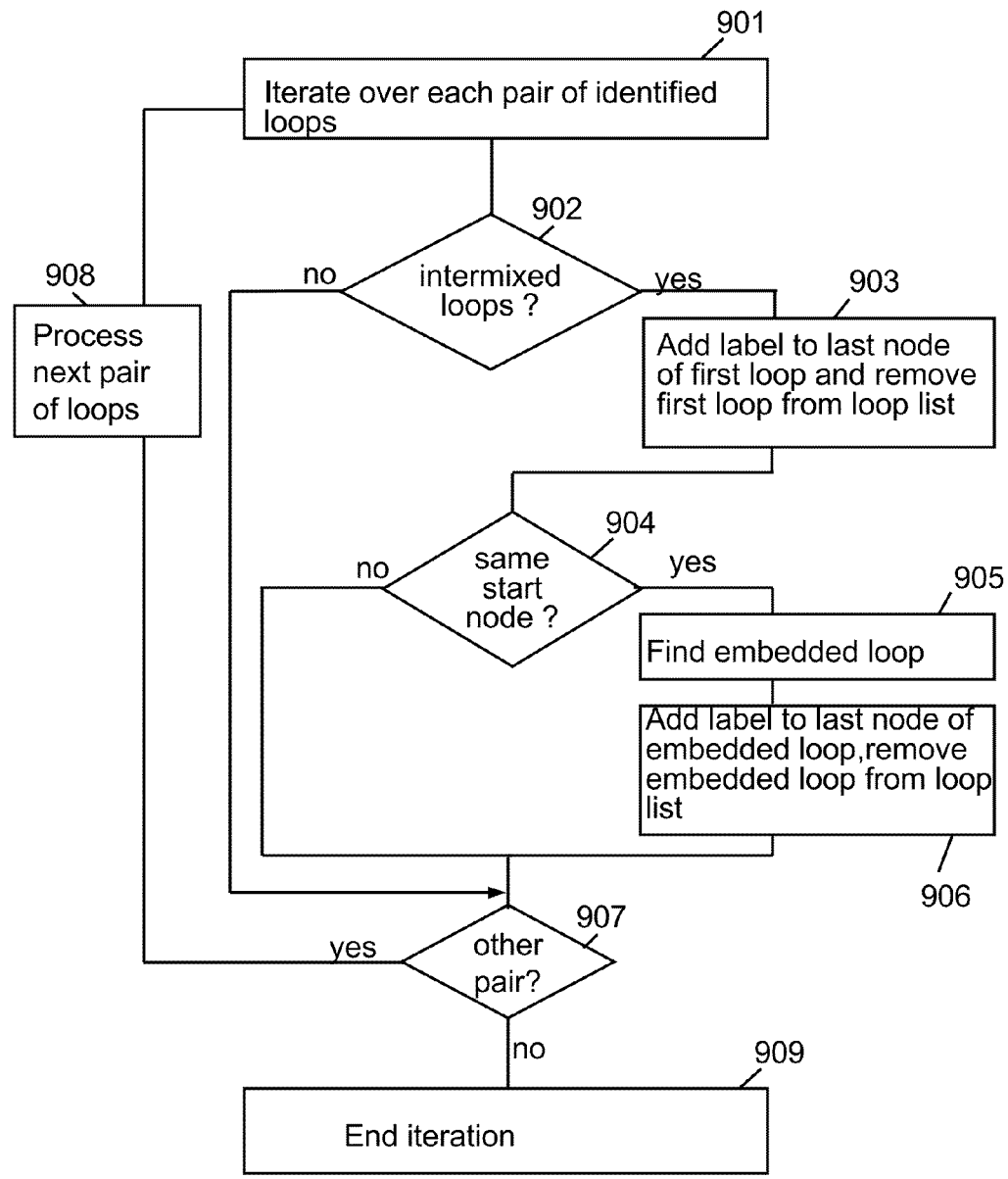
FIG. 9 shows a flowchart describing the resolution of intermixed cycles.

FIG. 9 shows a flowchart describing the resolution of intermixed cycles according to certain embodiments of the invention. To resolve intermixed cycles, the loops identified during the previous phases are compared one to another to identify when they mix. If they do, one is removed from the list of loops and will be handled as a GOTO in the next step. Accordingly, there only remains separated cycles and/or cycles contained in the body of other cycle(s) (nested). Therefore, during the code generation phase, it will be possible to make assumptions about the nature of the cycles, handling them directly as loops. This pre-processing provides information about sequence of nodes that have not yet been processed for code generation and allows for targeting the relevant code for more accurate code generation.

Step 901 iterates over all the combination of pairs from the list of loops calculated in FIG. 7.

Step 902 determines if the nodes defining the first loop in the pair are intermixed in the second loop. The second loop is intermixed with the first loop, if two conditions below are matched:

if the first node of the second loop is in the body of the first loop and the last node of the second loop is not in the body of the first loop, and if the two loops do not share the same first node. If the two loops are intermixed, then in step 903 the first loop is removed from the list of loops and, an unconditional transfer of control (GOTO) is added by marking or attaching a label to the last node of the first loop.

Step 904 then determines if the two loops of the current pair both start with the same node by comparing the first node of each loop of the pair.

If the two loops starts with the same node (step 904), step 905 determines which loop is in the body of the other loop to find the embedded loop. In step 906, the embedded loop is then removed from the list of loops and an unconditional transfer of control (GOTO) is added. The unconditional transfer of control is added by marking or attaching a label to the last node of the removed loop.

If the two loops are not intermixed (902) or if they do not start with the same node (904) or after step 906 is performed, step 907 determines if all pairs of loops have been processed. If so, the next pair of loop is processed in step 908 by iterating step 901 on this next pair of loop. If all the pairs of loops have been processed, the iteration is ended in step 909. As a result of the method of removing intermixed cycles in accordance with the disclosure, there only remain separated cycles and/or embedded cycles.

Figure 10:
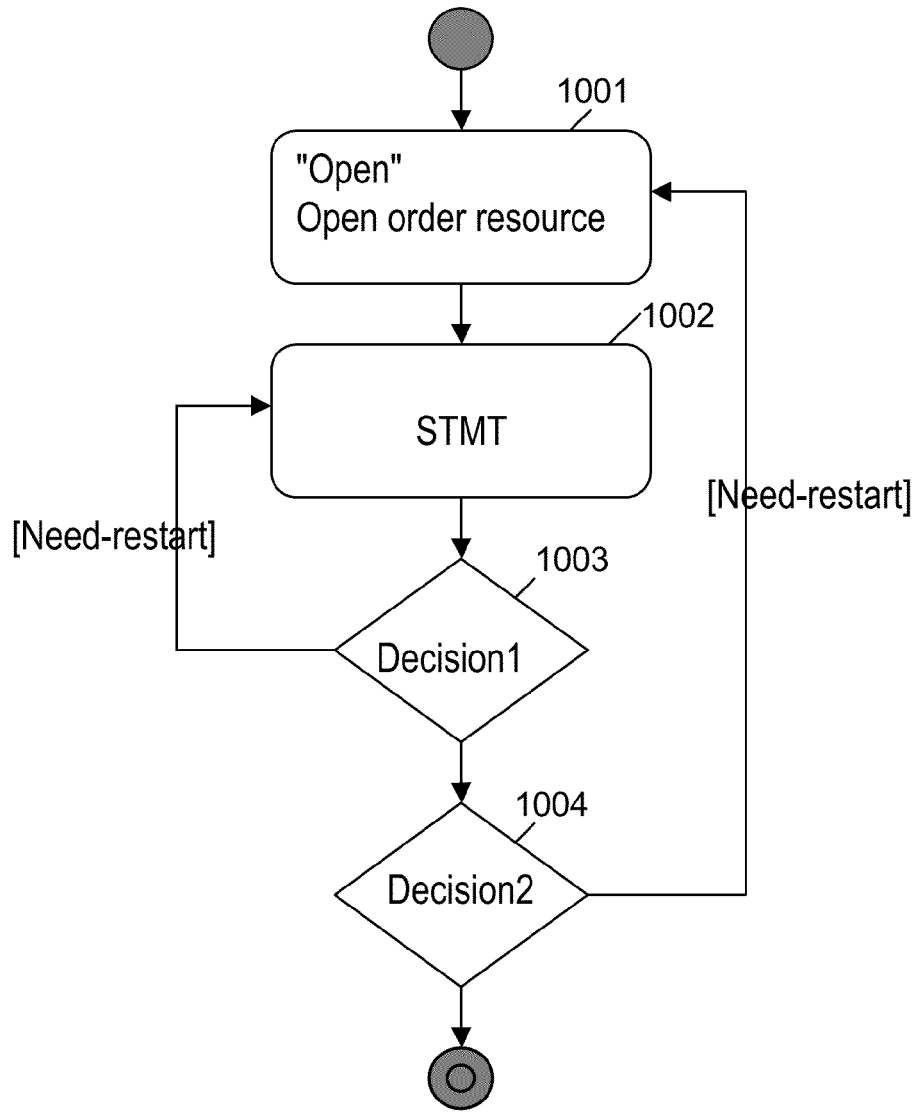
FIG. 10 shows an exemplary activity diagram including a "nested" cycle.
Figure 11:
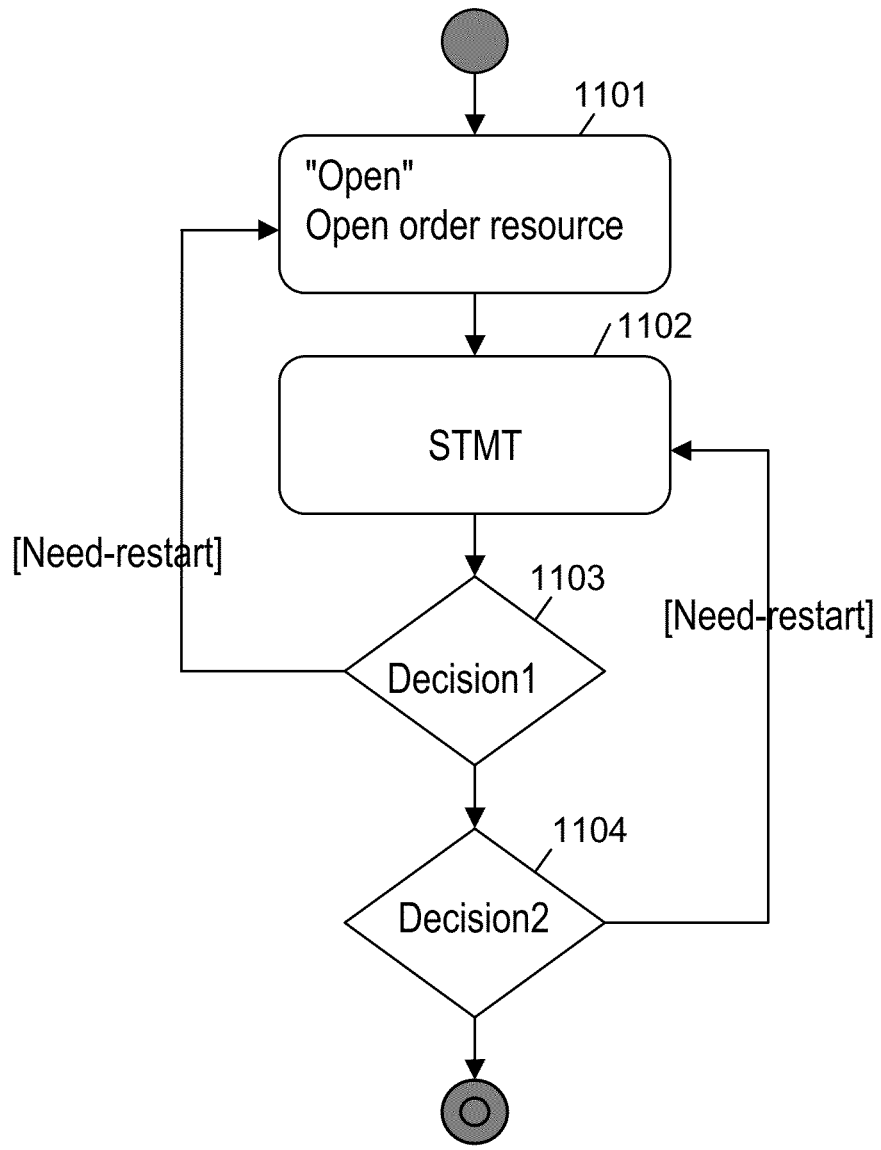
FIG. 11 shows an exemplary activity diagram including an "intermixed" cycle.

FIGS. 10 and 11 are exemplary activity diagrams showing different types of loops.

In FIG. 10, the first node 1001 called "open order resource" leads to node 1002 ("stmt"), then to the decision node 1003 ("decision1"), then to the decision node 1004 ("decision2") while decision node 1004 returns to node 1001. This therefore defines a first loop. Node 1002 leads to decision node 1003 which returns to node 1002. This defines a second loop. All the nodes of the second cycle, that is nodes 1002 and 1003, are included in the first cycle. The first cycle is therefore embedded in the second cycle (or "nested"). These two loops are therefore maintained in the list of identified loops, according to the method described with reference to FIG. 9.

In the activity diagram of FIG. 11, the node 1102 ("stmt") leads to the decision node 1103 ("decision 1"), which in turn leads to decision node 1104 ("decision 2"), while decision node 1104 returns to node 1102. This defines a first cycle. The second cycle includes node 1101 called "open order resource", followed by node 1102 and by decision node 1103, which returns to node 1101. The two loops are intermixed: the two loops overlap but one is not contained in the other. The resolution of intermixed cycles according to the disclosure (FIG. 9) for this activity diagram would generate a loop and an unconditional transfer of control (GOTO).

Figure 12:
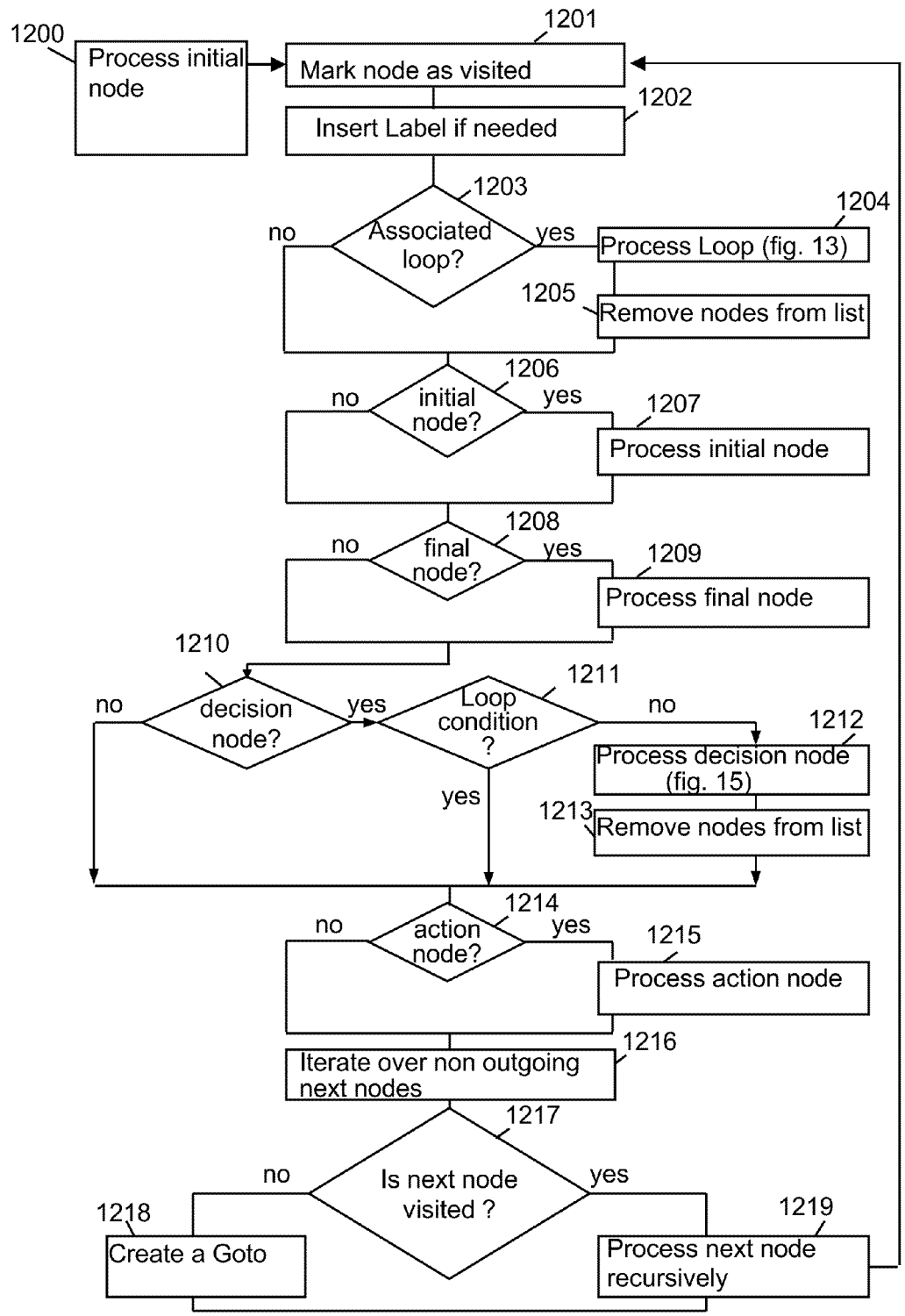
FIG. 12 shows a general flowchart describing the code conversion phase from the pre-processed activity diagram.

FIG. 12 is a flowchart illustrating the conversion of the activity diagram into code using the labels and data generated in the previous phases, including labels for simple decisions, data structures storing nodes involved in simple decisions, labels for GOTO, generated list of loops (with no intermixed loops). The code generation phase involves a third pass of the activity diagram to recursively process the nodes, using a depth first search like algorithm.

The conversion of the activity diagram into code relies on an intermediate representation of the code that is easy to manipulate and to translate into actual code. The code is represented through a tree. This tree is formed by nested sequences. A sequence may contain instructions, decisions or loops. A decision creates two sub-sequences. A loop creates one sub-sequence.

This tree can afterwards be turned into actual code through well known algorithmic.

In step 1200, the processing starts with the first node of the activity diagram. The main sequence of the program is created.

In step 1201, the current node is marked as being visited. If a label is associated to the node as a result of the previous phases, then in step 1202, the label is inserted in the current sequence of statements.

Figure 13:
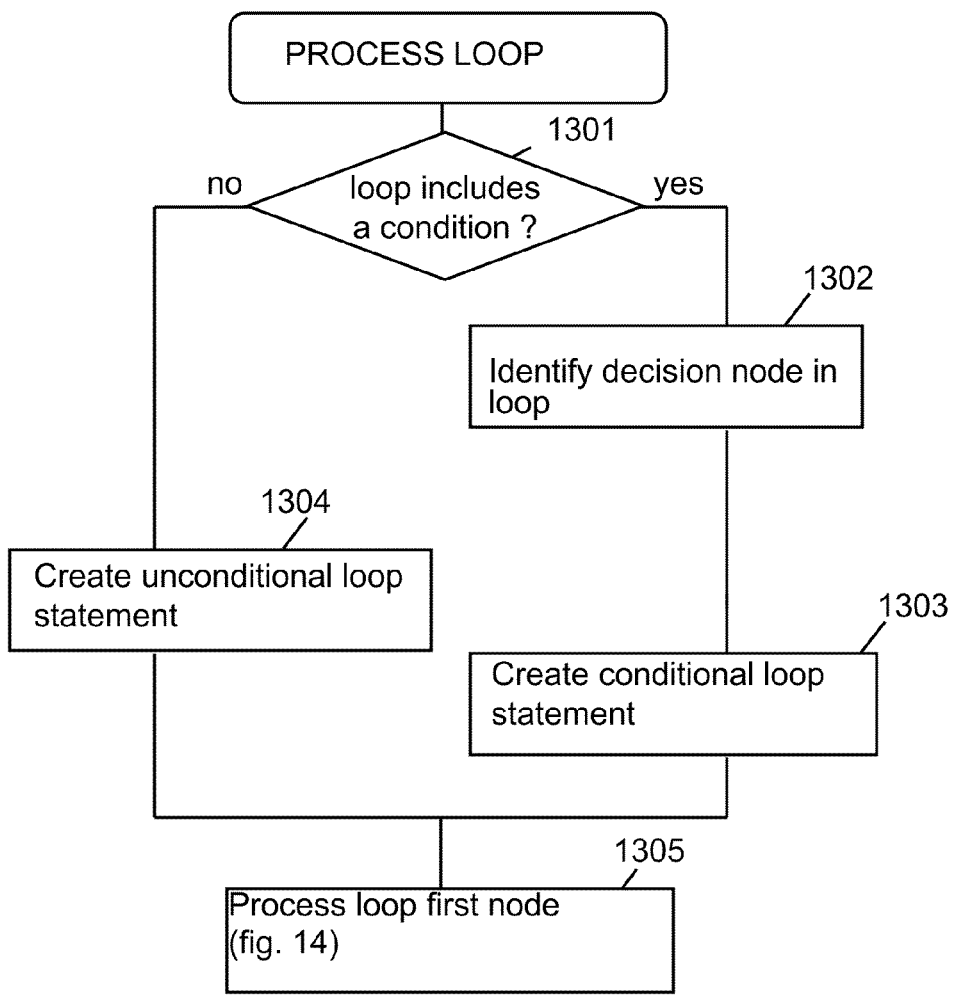
FIG. 13 shows a flowchart describing the translation of the activity diagram into a sequence of code when a loop is found.

If it is determined in step 1203 that a loop has been identified during the previous phases and is associated to the current node, then code statements are generated for the loop according to a specific loop process, in step 1204 (FIG. 13). A loop is added to the current sequence and a new sequence, for the loop contents, is created. Once the loop is processed in step 1204, the recursive processing of the activity diagram does not continue with the children nodes of the current node, but with the child node that follows the loop. This child node is identified as the next node to process in step 1205. However, if the processed loop is an unconditional loop, there is no next node processed in step 1205.

If it is determined that the current node is an initial node (step 1206), then the beginning of the program information is inserted in the sequence of statements in step 1207.

If it is determined that the current node is the final node (step 1208), then the end of the program information is inserted in the sequence of statements in step 1209.

Figure 15:
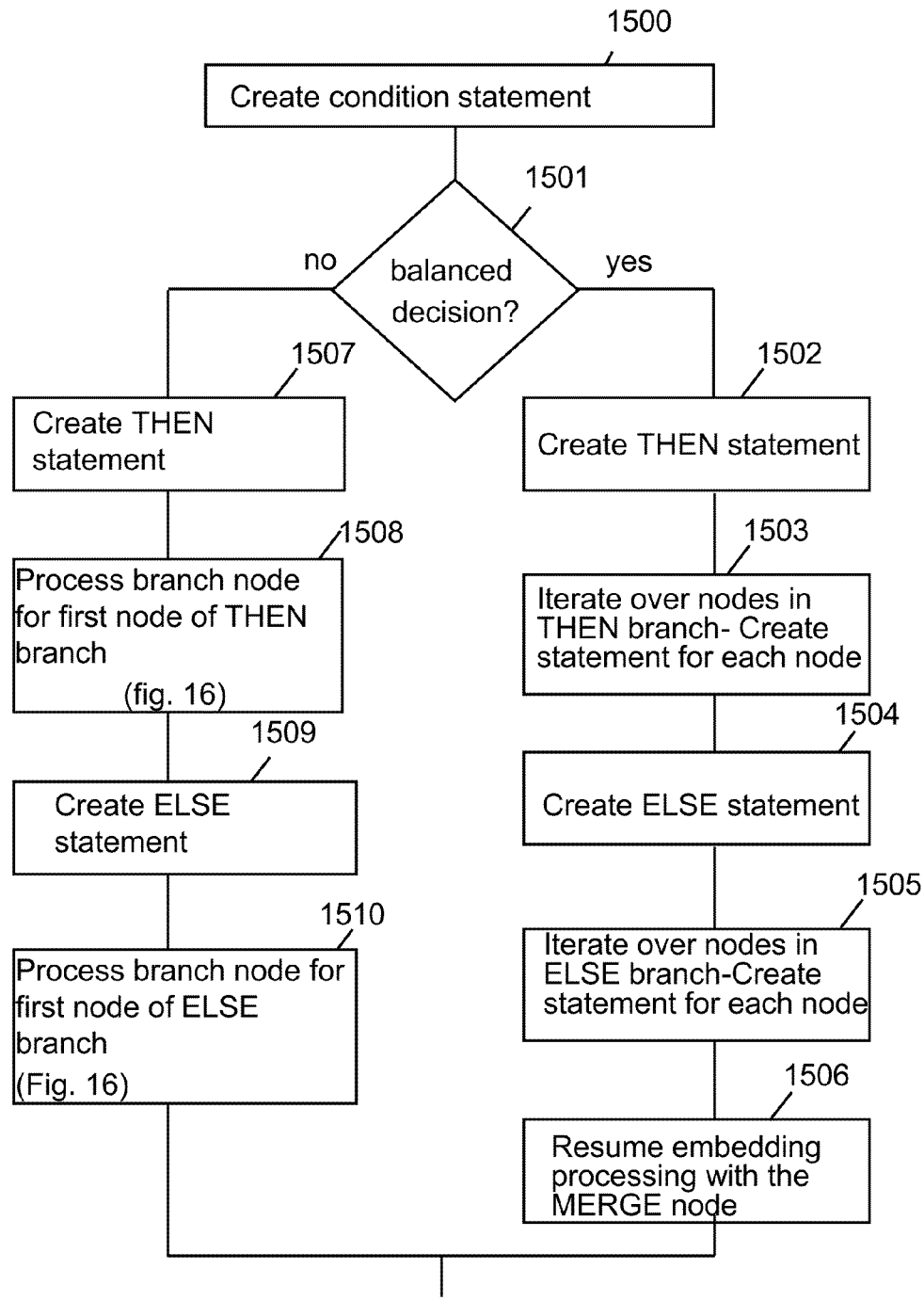
FIG. 15 shows a flowchart describing the steps performed to translate a decision into code.

If it is determined that the current node is a decision node (step 1210), then step 1211 further checks if the decision node is the condition of a loop. If so, this condition has already been handled by the loop processing phase and no further processing is needed (FIG. 13). However, if the decision node does not correspond to the condition of a loop then in step 1212 the decision node and its branches are processed (FIG. 15). Since in step 1212, the branches of the decision node have been processed, the recursive processing does not continue with the children nodes of the current node. Step 1213 identifies the next node to process. If the decision node is a simple (or balanced) decision node, then the recursive processing continues with the merge node of the branches of the simple decision node. If the decision node is not balanced, then the two branches have now been processed and do not merge. In such case, no next node is processed in step 1213.

If it is determined that the current node is an action node (step 1214), then the corresponding statement is inserted in the sequence of statements in step 1215.

In step 1216, the next nodes are processed. Since a recursive processing of loops and decision has been done during the previous steps, the next nodes are considered only if the current node is not a decision node or is not associated to a loop. If the decision node is a simple decision node, then there is one single next node which is the merge node. Step 1217 checks if the next node has already been visited or not. If it is determined that the next node has already been visited in step 1217, then a GOTO statement is added to the sequence in step 1218. A GOTO does not point to an instruction in the program but to a label that has been inserted in the program. Step 1202 has inserted labels in the sequence before translating the nodes that are target of GOTOs. This label associated with the next node is used as an argument for the GOTO.

If it is determined that the next node has not been visited in step 1217, then step 1219 reiterates the process for this next node starting from step 1201.

FIG. 13 is a flowchart illustrating the processing that is performed to translate the activity diagram into a sequence of code when a loop is found (step 1204 of FIG. 12) in accordance with embodiments of the invention. As a result of the previous phases of the activity diagram processing, the loops are now filtered. This guarantees that the remaining loops cannot share the same first node. Consequently, cycles may contain other cycles and/or be completely independent from other cycles (no common node), but do not include intermixed cycles and no cycles with the same first node.

Step 1301 calculates if the loop starts or ends with a decision node to determine if the loop is a conditional loop or an unconditional loop. A conditional loop continues to loop while a given condition is true. An unconditional loop either has no condition (a GOTO loop), or the condition is guaranteed to always evaluate to true.

If it is determined that the loop is a conditional loop in step 1301, then the condition is retrieved in step 1302 and the conditional loop statement is added to the sequence of code statements with its condition in step 1303. If it is determined in step 1301 that the loop is an unconditional loop, then an unconditional loop statement is added to the sequence of code statements in step 1304.

Figure 14:
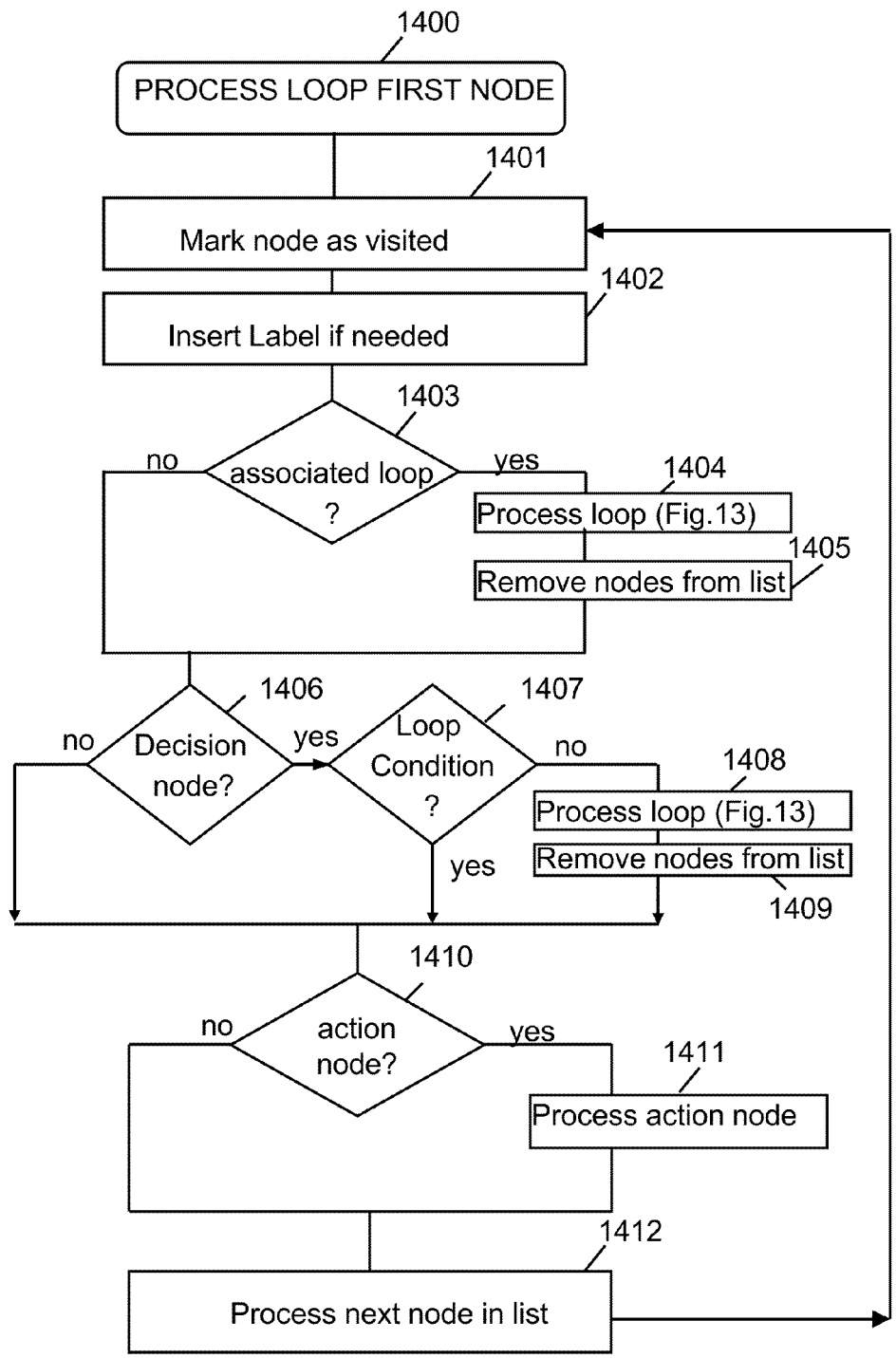
FIG. 14 shows a flowchart describing the steps performed to convert a loop into code.

In step 1305, the processing of the loop content itself starts with its first node in the list (FIG. 14).

FIG. 14 illustrates the recursive processing 1305 of the loop nodes. The processing is invoked on the first node associated with a loop in step 1400. The pre-processing steps 215 and 220 have identified loops and created in-memory list of nodes that represent the nodes involved in the loop. This list is associated with the first node involved in a loop. In step 1401, this node is marked as visited. If a label is associated with the node, then the label is inserted in the sequence of statements in step 1402.

In step 1403, it is determined if a loop has been identified in the previous processing steps 215 and 220 and is associated with the current node. If so, then 1404 converts the loop into code as described with reference to FIG. 13. Step 1404 represents the case of nested loops. The nodes of the loop are then removed from the list of nodes in step 1405.

Step 1406 checks if the current node is a decision node. If it is determined that the current node is a decision node (step 1406), then step 1407 checks if the decision node is the condition of a loop. If so, this condition has already been handled by the loop processing phase and no further processing is needed. However, if the decision node does not correspond to the condition of a loop then in step 1408, the decision node and its branches are processed (FIG. 15) and the nodes of the decision are removed from the list of nodes in step 1409.

If the current node is identified as an action node in step 1410, the corresponding statement is inserted in the sequence of statements in step 1411. The next node in the list is then processed recursively (step 1412) by reiterating step 1401 for the next node.

FIG. 15 is a flowchart illustrating the processing of decision nodes.

In step 1501, a decision statement is added in the sequence of statements. Step 1501 then checks whether the decision node corresponds to a balanced decision. If the decision node represents a balanced decision, the nodes that are included in the two branches of the balanced decision node are retrieved from memory and a THEN statement is added to the sequence of statements in step 1502. Step 1503 iterates over the nodes that belong to the THEN branch, and adds the corresponding statements to the sequence of statements. Step 1504 then processes the ELSE branch similarly and adds an ELSE statement to the sequence of statements. Step 1505 iterates over the nodes that belong to the ELSE branch, and adds the corresponding statements to the sequence of statements. The processing of the embedding construct continues with the merge node in step 1506. This is the case of a simple decision, previously detected in step 210. The branches of a simple decision are known to merge and the flow of the sequence is supposed to resume when the merge node is reached.

Figure 16:
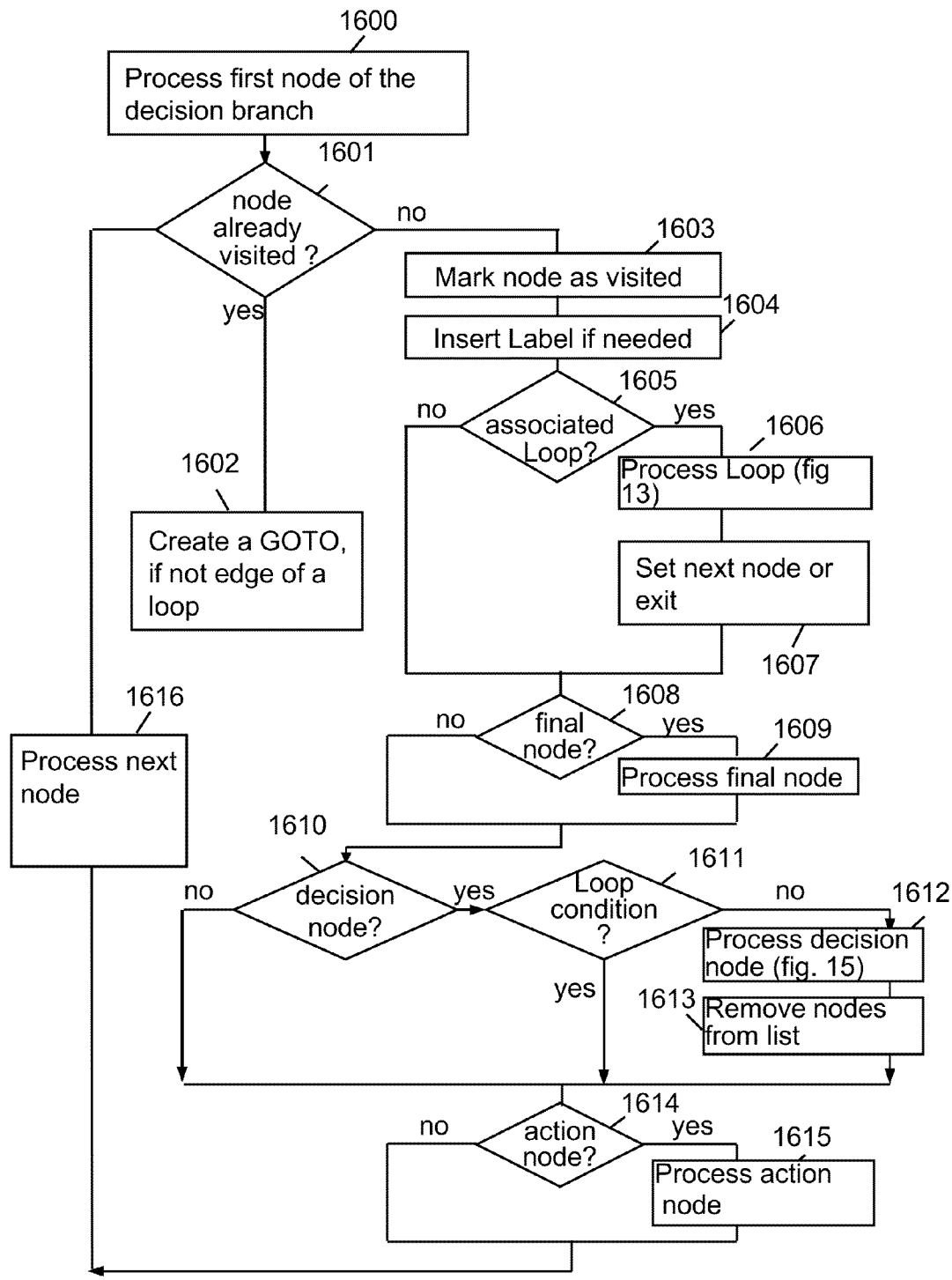
FIG. 16 shows a flowchart describing the conversion steps performed to translate the nodes of a decision branch into code, when a decision node belonging to a loop is detected.

If it is determined that the decision node is not a balanced decision in step 1501, then the two branches of the decision are processed. First, the THEN statement is added to the sequence in step 1507, and the THEN branch is processed in step 1508 (FIG. 16). The ELSE statement is further added to the sequence in step 1509 and the ELSE branch is processed in step 1510 (FIG. 16).

FIG. 16 is a flowchart illustrating the processing of a branch of decision that belongs to a loop. FIG. 16 is invoked on the first node of a branch (THEN or ELSE branch) in step 1600.

Step 1601 first checks if the node has already been visited. Edges of a cycle will be visited twice, so they are special cases where nothing should happen. If the node is not an edge of a cycle, then in step 1602 a GOTO statement is added to the code sequence.

If the node has not been visited, then a process similar to the process described with reference to FIG. 14 is applied. The recursion occurs on the nodes of the branch. First the current node is marked as visited in step 1603. If a label is associated with the node, then the label is inserted in the sequence of code statements in step 1604.

If a loop previously identified is associated with the current node (step 1605), then in step 1606 the loop is processed (FIG. 13). After processing the loop, the recursive processing of the branch need not to continue with the children nodes of the current node, but with the child node that follows the cycle. This child node is identified as the next node to process (step 1607). In the case of an unconditional loop, there is no next node (exit in step 1607).

If the node is a final node (step 1608) then, in step 1609, the end of the program information is associated in the sequence of code statements.

If the current node is a decision node (1610), then it is determined if the decision node is condition node of a loop (step 1611). If so, this condition has already been handled by the loop processing phase and no further processing is needed. However, if the decision node does not correspond to the condition node of a loop then in step 1612, the decision node and its branches are processed according to the method of converting decision node described above with reference to FIG. 15. Step 1613 identifies the next node to process. If the decision node is a balanced decision node, then the recursive processing should continue with the merge node of the branches of the balanced decision node. If the decision node is not balanced, then the two branches have been processed and will not merge. Therefore there is no next node.

If the node is an action node (step 1614) then the corresponding statement is inserted in the sequence of statements in step 1615.

At this stage the current node has been processed, and the next node in the branch is selected (step 1616) for recursive processing (step 1601).

The disclosure accordingly provides an efficient solution for automatically converting the graph of an activity diagram into a sequence of code and removes the limitations and restrictions in the design of the activity diagram.

Activity diagrams can thus capture the control flow that a developer is designing in a way that fully uses the combination of nodes provided by the design model language specifications.

With embodiment disclosed herein, it is not required to involve a merge node every time a decision node is used. As a result, an output of a decision node can be linked to a point that does not belong to the same branch of the graph.

The method according to the invention also combines in a single pass a technique based on an in-depth graph processing and a technique that resolves the sub-graph that contain balanced opened and closed decision nodes. Thereby, the context and intents of the original graph are preserved.

The graph traversal provided in accordance with the invention allows to process any kind of graph for the more simple to the more complex, while preserving in the right sequence the balanced decisions (conditions ending with a common node).

Further, the disclosure does not depend on a specific programming language structure and allows code generation from an activity diagram in any desired programming language.

The disclosure can take the form of an entirely hardware embodiment, an entirely software embodiment or an embodiment containing both hardware and software elements. In a preferred embodiment, the disclosure is implemented in software, which includes but is not limited to firmware, resident software, microcode, etc. Software can be digitally encoded on a tangible storage medium.

Furthermore, embodiment of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The preceding description of embodiments of the invention has been presented for the purposes of illustration. The description provided is not intended to limit the invention to the particular forms disclosed or described. Modifications and variations will be readily apparent from the preceding description. For example, while the description has been made with reference to decision nodes including two branches THEN and ELSE for illustrative purpose, the skilled person will readily understand that the invention also applies to activity diagrams including decision nodes having more than two branches (such as for UML activity diagrams used to capture a condition that compares a variable with several possible literals or integers). For such activity diagram, the statement associated to the decision node would be converted into a switch instead of an IF, while the THEN and ELSE statements would be replaced by a case with the appropriate literal. As a result, it is intended that the scope of the disclosure not be limited by the detailed description provided herein.

The invention claimed is:

1. A method of converting an activity diagram into code, comprising:
a. traversing the activity diagram to identify cycles included in the activity diagram;
b. resolving intermixed cycles among said identified cycles to only maintain separated cycles and/or cycles contained in of other cycles, said step of resolving intermixed cycles comprising comparing the identified cycles one to another to determine if they have common nodes, removing one of the cycles from said identified cycles and marking the other cycle as a GOTO loop, if the compared cycles have common nodes;
c. traversing the activity diagram and for each traversed node, generating code statements based on a type of node and the results of steps a and b, wherein steps a, b, and c are performed by at least one computing device.

2. The method of claim 1, further comprising:
identifying simple decisions in said activity diagram by initially traversing the activity diagram, said step of identifying simple decisions including for each current node being traversed marking nodes of branches up to a closing node as involved in a simple decision, if the current node is a decision node and if the branches of said decision node share a closing node.

3. The method of claim 2, further comprising:
storing nodes identified as involved in a simple decision in data structures and attaching a label to a first node of the simple decision in the activity diagram.

4. The method of claim 1, wherein step a, comprises, for each current node being traversed, marking the current node as visited, and determining if the current node is a decision node and if so, examining each branch of the current node, said step of examining each branch including for each explored node in said branch determining if the explored node has already been visited, and if so:
determining if a parent of the current node matches said explored node,
if one parent of the current node matches said explored node, identifying a cycle,
if no parent of the current node matches the explored node, identifying a branch node as a GOTO loop.

5. The method of claim 4, further comprising repeating step a, for said explored node, if the explored node has not been visited.

6. The method of claim 3, further comprising, if the current node is not a decision node, determining if the next node in the activity diagram has already been visited, and if so,
determining if a parent of the current node matches the next node,
if one parent of the current node matches a next node, identifying a cycle,
if no parent of the current node matches the next node, identifying a branch node as a GOTO loop.

7. The method of claim 1, wherein step c, comprises for each node being traversed, determining if a current node is marked as a loop node, and if so generating loop statements based on whether the loop is conditional and unconditional, and reiterating step c, for each node in the loop.

8. The method of claim 7, wherein step c, comprises determining if a current node is a decision node, and if so generating decision statements based on whether the decision node is simple decision.

9. The method of claim 8, wherein step c, comprises generating a THEN and an ELSE statement, and repeating step c for each node in each branch of the decision node, if the decision node is not a simple decision node.

10. The method of claim 1, further comprising:
storing the results of steps a, and b, in data structures and attaching a label to a first node of an identified pattern in the activity diagram.

11. A system for converting an activity diagram into code comprising:
- a processor;
- a non volatile memory;
- a volatile memory; and
- a bus connecting the processor, non volatile memory and volatile memory, wherein at least one of the non volatile memory and the volatile memory store computer program product able to be utilized by the system, where execution of the computer program product using the processor, the non volatile memory, and the volatile memory causes the system to:
  - a. traverse an activity diagram to identify cycles included in the activity diagram, wherein for each current node being traversed, marking the current node as visited, and determining if the current node is a decision node and if so, examining each branch of the current node, said step of examining each branch including for each explored node in said branch determining if the explored node has already been visited, and if so:
    - determining if a parent of the current node matches said explored node,
    - if one parent of the current node matches said explored node, identifying a cycle,
    - if no parent of the current node matches the explored node, identifying a branch node as a GOTO loop;
  - b. resolve intermixed cycles among said identified cycles to only maintain separated cycles and/or cycles contained in other cycles, said step of resolving intermixed cycles comprising comparing the identified cycles one to another to determine if they have common nodes;
  - c. traverse the activity diagram and for each traversed node, generating code statements based on a type of node and the results of steps a and b.

12. The system of claim 11, wherein said step b, comprises, removing one of the cycles from said identified cycles and marking the other cycle as a GOTO loop, if the compared cycles have common nodes.

13. The system of claim 11, wherein step c, comprises for each node being traversed, determining if a node being traversed is marked as a loop node, and if so generating loop statements based on whether the loop is conditional and unconditional, and reiterating step c, for each node in the loop.

14. A computer program product stored on a non-transitory storage medium comprising instructions to converting an activity diagram into code when said computer program product is executed on a suitable computer device, said computer program product when executed on a suitable computer device performing the steps of:
  - a. traversing the activity diagram to identify cycles included in the activity diagram;
  - b. resolving intermixed cycles among said identified cycles to only maintain separated cycles and/or cycles contained in other cycles, said step of resolving intermixed cycles comprising comparing the identified cycles one to another to determine if they have common nodes, removing one of the cycles from said identified cycles and marking the other cycle as a GOTO loop, if the compared cycles have common nodes;
  - c. traversing the activity diagram and for each traversed node, generating code statements based on a type of node and the results of steps a and b.

15. The computer program product of claim 14, wherein step a. comprises, for each current node being traversed, marking the current node as visited, and determining if the current node is a decision node and if so, examining each branch of the current node, said step of examining each branch including for each explored node in said branch determining if the explored node has already been visited, and if so:
  - determining if a parent of the current node matches said explored node,
  - if one parent of the current node matches said explored node, identifying a cycle,
  - if no parent of the current node matches the explored node, identifying a branch node as a GOTO loop.

16. The computer program product of claim 14, wherein step c. comprises for each node being traversed, determining if a node being traversed is marked as a loop node, and if so generating loop statements based on whether the loop is conditional and unconditional, and reiterating step c. for each node in the loop.

* * * * *